United States Patent [19]

Wolf et al.

[11] 4,255,551

[45] Mar. 10, 1981

[54] COATING MATERIALS AND THEIR APPLICATION PREPARED FROM POLYISOCYANATES BLOCKED WITH IMIDAZOLINES

[75] Inventors: Elmar Wolf, Herne; Johann Obendorf, Dorsten; Rainer Gras, Herne, all of Fed. Rep. of Germany

[73] Assignee: Chemische Werke Huls AG, Herne, Fed. Rep. of Germany

[21] Appl. No.: 948,150

[22] Filed: Oct. 3, 1978

[30] Foreign Application Priority Data

Oct. 5, 1977 [DE] Fed. Rep. of Germany ....... 2744721

[51] Int. Cl.³ ............................................. C08G 18/80
[52] U.S. Cl. ...................... 528/45; 252/182; 264/141; 427/27; 427/226; 427/435; 427/430.1; 428/423.7
[58] Field of Search .......................... 528/45; 264/141; 252/182; 428/425; 427/226, 27, 430 R, 435

[56] References Cited

U.S. PATENT DOCUMENTS

| | | | |
|---|---|---|---|
| 3,146,493 | 9/1964 | Steinle et al. | 264/141 |
| 3,676,402 | 7/1972 | Matsui et al. | 528/45 |
| 3,887,476 | 6/1975 | McConnell | 548/349 |
| 3,896,082 | 7/1975 | Rensmann et al. | 260/37 EP |
| 3,956,237 | 5/1976 | Doorakian et al. | 260/2 N |
| 4,046,744 | 9/1977 | Jenkins | 428/423 |
| 4,060,655 | 11/1977 | Johannes et al. | 428/35 |
| 4,096,291 | 6/1978 | Dunwald et al. | 427/120 |
| 4,151,220 | 4/1979 | Watanabe et al. | 528/45 |

*Primary Examiner*—Maurice J. Welsh
*Attorney, Agent, or Firm*—Oblon, Fisher, Spivak, McClelland & Maier

[57] ABSTRACT

Powdered, heat-hardenable coating materials with high storage stability and a grain size smaller than 0.25 mm based upon hydroxy-group-containing polyesters with melting points between 40° and 120° C., blocked polyisocyanates and optionally catalysts, wherein the coating material contains polyisocyanates blocked with cyclic amidines of the general formula

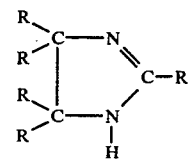

wherein R=equal or different substituents selected from the group consisting of hydrogen, alkyl-, cycloalkyl-, aralkyl-, and alkyl radicals. A method for the production of the above mentioned coating materials and a process for coating substrates with these materials is also disclosed.

14 Claims, No Drawings

COATING MATERIALS AND THEIR APPLICATION PREPARED FROM POLYISOCYANATES BLOCKED WITH IMIDAZOLINES

BACKGROUND OF THE INVENTION

1. Field of the Invention

The present invention deals with powdered coating materials based on a mixture of polyesters and blocked polyisocyanates.

2. Description of the Prior Art

Pulverizable polyepoxides were the first bonding agents that found a great amount of interest as raw materials for powdered lacquers. It was only in 1965 that phenol-blocked polyisocyanates were described as new raw materials for powdered lacquers in DL-PS No. 55 820. Powdered mixtures of high melting point hydroxyl-group containing polyesters and polyisocyanates, whose isocyanate groups are blocked by phenol, can be applied by electrostatic spraying or by spraying on the substrate and can subsequently, be hardened into coatings by heating. The disadvantages of this process are caused by the splitting-off of phenol: strong bothersome odors, flowing problems and, especially, blister formation.

According to the experience of DT-AS No. 1,957,483, these disadvantages can be avoided if ε-caprolactam-blocked polyisocyanates are used instead of the previously mentioned phenol-blocked compounds.

However, for many areas of application, the reactivity of these ε-caprolactam-blocked, aliphatic diisocyanates and hydroxyl-containing polyester systems, as described in DT-AS No. 1,957,483, is insufficient, even in the presence of catalysts.

SUMMARY OF THE INVENTION

New blocked polyisocyanates were now found that, surprisingly, combine the most important advantageous properties of the above mentioned hardeners without showing their disadvantages.

Subjects of the invention are powdered coating materials with high storage stability and a grain size smaller than 0.25 mm, preferably between 0.02 and 0.06 mm, based upon hydroxyl-group-containing polyesters with melting points between 40° and 120° C., blocked polyisocyanates and, possibly, catalysts as well as the usual lacquer additives, wherein the coating material contains polyisocyanates, blocked with cyclic amidines of the following general formula

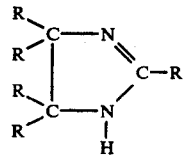

wherein R=equal or different substituents selected from the group of hydrogen, alkyl-, cycloalkyl-, aralkyl- and aryl radical. Hydroxyl-group containing polyesters and blocked polyisocyanates are contained in the powdered coating materials in such amounts that 0.9 to 1.1 NCO-group equivalents are applied per hydroxyl group equivalent.

DETAILED DESCRIPTION OF THE PREFERRED EMBODIMENTS

The blocked polyisocyanates according to this invention are compatible with most of the solid polyesters and, at elevated temperatures (80° to 120° C.), provide homogeneous melts that are well suited to the production of sinter powders. The hardenable mixtures according to this invention are very stable upon storage at room temperature, i.e. they change neither physically (no lumping) nor chemically, i.e. the components of the coating materials do not react at room temperature. The hardening periods are in the range between 20 to 4 minutes at a temperature range between 140° and 200° C. The hardening mechanism is assumed to be complex. During hardening, there is a de-blocking of the hardeners into the cyclic amidines and the polyisocyanates. The liberated NCO-groups react with the OH-groups of the polyester by way of an NCO/OH reaction by formation of urethane. The hardened coatings are characterized by very good chemical and mechanical properties, as well as resistance to chemicals.

The hydroxyl-group-containing polyesters that are used according to this invention and which are solid below 40° C. and have melting points between 40° and 120° C., can comprise aliphatic, cycloaliphatic and/or aromatic polycarboxylic acids.

Suitable aliphatic, cycloaliphatic and aromatic carboxylic acids, where the aromatic ones can be mono- or multi-nuclear, e.g. oxalic acid, succinic acid, glutaric acid, 2,2-dimethyl glutaric acid, adipic acid, 2,2,4- or 2,4,4-trimethyl adipic acid, sebacic acid, dodecane dicarboxylic acid, terephthalic acid, methyl-terephthalic acid, 2,5-and 2,6-dimethyl-terephthalic acid chloroterephthalic acid, 2,5-dichloro-terephthalic acid, fluoroterephthalic acid, isophthalic acid, trimellitic acid, naphthaline-dicarboxylic acid, especially the 1,4- 1,5-, 2,6- and 2,7-isomers, phenylene-1,4-diacetic acid, 4-carboxyphenoxy-acetic acid, m- and p- terphenyl-4,4'''-dicarboxylic acid, dodecahydrodiphenic acid, hexahydroterephthalic acid, 4,4'-diphenic acid, 2,2'- and 3,3'-dimethyl-4,4'-diphenic acid, 2,2'-dibromo-4,4'-diphenic acid, bis-(4-carboxyphenyl)-methane, 1,1- and 1,2-bis(4-carboxyphenyl)ethane, 2,2-bis(4-carboxyphenyl)-propane, 1,2-bis-(4-carboxyphenyl)ethane, bis-4-carboxyphenyl ether, bis-4-carboxyphenyl sulfide, bis-4-carboxyphenyl ketone, bis-4-carboxyphenyl sulfoxide, bis-4-carboxyphenyl sulfone, 2,8-dibenzofuran-dicarboxylic acid, 4,4'-stilbene-dicarboxylic acid and octadecahydro-m-terphenyl-4,4''-dicarboxylic acid and others. Naturally, instead of the indicated acids one can also employ their functional derivatives, such as anhydrides, esters and others. Mixtures of the mentioned compounds can also be used.

Diols are preferably used as alcohol components for the production of the hydroxyl-group-containing polyesters. Partial coapplication of other polyols, e.g. triols is possible. Examples for suitable compounds are the following: ethylene glycol, propylene glycol, like 1,2- and 1,3 propanediol, 2,2-dimethylpropane-diol-(1,3), butane diols, such as butanediol-(1,3) or (1,4), hexane diols, e.g. hexane diol-(1,6), 2,2,4-trimethylhexane diol-(1,6), 2,4,4-trimethylhexane diol-(1,6), 2,4,4-trimethylhexanediol-(1,6), heptanediol-(1,7), thiodiglycol, octadecanediol-(1,18), 2,4-dimethyl-2-propylheptanediol-(1,3), butene- or (1,4), diethylene glycol, triethylene glycol, cis- and trans-1,4-cyclohexane dimethanol, 1,4-cyclohexane diols, 2,2-bis-(4-hydroxycyclohexyl)-propane, bisoxyethylated 2,2-bis-(4-hydroxyphenyl)-propane, glycerine, hexane triol-(1,2,6), 1,1,1-trimethylolpropane, 1,1,1-trimethylol ethane, pentaerythrol and others. Mixtures of the previously mentioned compounds can also be used.

During production of the polyesters, the polyol is employed in such amounts that more than 1 OH-group equivalent is applied to each (1) carboxy-group equivalent, so that polyesters with hydroxyl numbers between 40 and 240, preferably between 40 and 150, are obtained.

The hydroxyl-group-containing polyester can be produced in known and usual manner. The two following methods are themselves especially useful.

In the first case, one starts, for example with a mineral-acid free terephthalic acid, which, if necessary, may be purified by recrystallization. The ratio of the equivalents of acids to alcohol, naturally, depends on the desired size of molecules and on the OH-number to be produced. The reaction components are heated, after addition of 0.005 to 0.5 wt-%-preferably 0.05 to 0.2 wt-%, of a catalyst, e.g. tin compounds, like di-n-butyl-tin oxide, di-n-butyl-tin diester and others, or titanium esters, especially tetraisopropyl-titanate, in a suitable apparatus under flushing with an inert gas, e.g. nitrogen. The first water separation will occur at about 180° C. The water is removed from the reaction mixture by distillation. Over the period of several hours, the reaction temperature is raised up to 240° C. The reaction medium remains inhomogeneous until shortly before the end of completed esterification. The reaction is concluded after about 24 hours.

According to the second procedure, one starts, for example, with terephthalic acid dimethyl ester and esterifies under an inert-gas flushing, e.g. with nitrogen, with the desired alcohol components. As catalysts for re-esterification, again, titanium esters, dialkyltin-esters or di-n-butyl-tinoxide, can be used in concentrations of between 0.005 to 0.5 wt-%. Methanol will begin to split off after the temperature reaches about 120° C. the temperature is raised 220° to 230° C. over a period of several hours. Depending upon the selected raw materials, re-esterification is completed after 2 to 24 hours.

The softening points of the polyester must be within the described range so that they can be processed at temperatures between 70° and about 120° C. with the additives that are needed for the production of the coating materials according to this invention. But, on the other hand, the softening points must also be high enough, that the coating materials, produced from the polyesters, according to this invention, can be milled into non-lumping, free-flowing powders with a particle size of 20 to 120μ.

The blocked polyisocyanates, which have been blocked with the cyclic of the described general formula, which are used according to this invention, can be produced by the reaction at temperatures of 0° to 150° C., preferably at 80° to 120° C., whereby the polyisocyanates and the cyclic amidines are employed in such amounts that 0.5 to 1.1, preferably 0.8 to 1.0 mol of cyclic amidine are used for each (1) isocyanate group. The applied reaction temperature should, however, be below the dissociation temperature of the adducts.

Conversion can take place in solvents, as well as in the melt or in excess polyisocyanate.

The following are starting compounds that are applicable to the blocking with the cyclic amidines, these are polyisocyanates, especially diisocyanates, such as aliphatic, cycloaliphatic, araliphatic, i.e. aryl-substituted aliphatic and/or aromatic diisocyanates. Some of these are, for example, described in Houben-Weyl "Methods of organic Chemistry" Vol. 14/2, pp 61 to 70, as well as in the paper by W. Siefken in "Justus Liebig's Annalen der Chemie" 562, 75 to 136. Among these are 1,2-ethylene-diisocyanate, 1,4-tetramethylenediisocyanate, 1,6-hexamethylene-diisocyanate, 2,2,4- or 2,4,4-trimethyl-1,6-hexamethylene-diisocyanate (TMDI); dodecan-diisocyanate-1,12; ω,ω'-diisocyanato-dipropyl ether; cyclobutane-1,3-diisocyanate; cyclohexane-1,3- and 1,4-diisocyanate; 3-isocyanatomethyl-3,5,5-trimethyl-cyclohexyl isocyanate; which is also described as isophorone-diisocyanate and is abbreviated IPDI; decahydro-8-methyl-(1,4-methano-naphthaline-2 (or 3); 5-ylene-dimethylene-diisocyanate; hexahydro-4,7-methanoindane-1 (or 2)- 5 (or 6)-ylene-dimethylene-diisocyanate; hexahydro-4,7-methano-indane-1 (or 2)-5 (or 6)-ylene diisocyanate; Hexahydro-1,3 or 1,4-phenylene diisocyanate; 2,4- and 2,6-hexahy-drotoluylenediisocyanate; perhydro-2,4'- and/or -4,4'-diphenyl-methane-diisocyanate; ω,ω'-diisocyanate-1,4-diethyl benzene 1,4-phenylene-diisocyanate; 4,4'-diisocyanato-diphenyl; 4,4'-diisocyanato-3,3-dichloro-diphenyl; 4,4'-diisocyanato-3,3'-dimethoxydiphenyl; 4,4'-diisocyanato-3,3'-dimethyl-diphenyl; 4,4'-diisocyanato-3,3'-diphenyl-diphenyl; 4,4'-diisocyanato-diphenyl methane; naphthylene-1,5-diisocyanate; toluylene-diisocyanate; toluylene-2,4- or 2,6-diisocyanate; N,N'-(4,4'-dimethyl-3,3'-diisocyanatodiphenyl)-uretdione; m-xylylene-diisocyanate; and also the triisocyanates, like 2,4,4'-triisocyanato-diphenyl ether; 4,4',4"-triisocyanato-triphenyl methane; tris-(4-isocyanato-phenyl)-thiophosphate; as well as any desired mixtures of these compounds. Further suitable isocyanates are described in the mentioned paper in the "Annalen" on page 122 f.

Especially preferred are, generally, the technically easily accessible aliphatic, cycloaliphatic or aromatic diisocyanates and, especially 3-isocyanatomethyl-3,5,5-trimethyl-cyclohexyl isocyanate and 2,4-toluylene diisocyanate, as well as their isomeric mixtures.

Besides of the monomeric polyisocyanates, it is also possible to use, as starting materials with the imidazolines that will be more specifically described in the following, also the dimeric and trimeric forms of the polyisocyanates, like uretdiones, biuret and isocyanurates and urethane adducts, which can be produced according to known methods. Included among the polyisocyanates in the sense of the present invention, are also those that have, prior to blocking with the imidazolines, been subjected to a conversion for molecule enlargement with the so-called chain extension agents that are usual in isocyanate chemistry, such as water, polyols, polyamines and others. In this connection, the bi- or tri-functional chain extension product, i.e. products that have groups that are reactive towards isocyanate groups, such as hydroxyl- and/or amino-group bearing compounds, are applied in such amounts that the resulting, new, isocyanate carries on the average at least 2 isocyanate groups. When using water as the chain extension product, polyisocyanates will result with one or several ureido groupings.

Suitable polyols are, for example, the diols and triols, which can also be used for the production of the hydroxyl-group containing polyesters.

Of the polyamines that are suitable for chain extension or molecular enlargement, several are to be mentiond as examples. Among them are: ethylene diamine-1,2; propylene diamine 1,2 and 1,3; butylene diamine-1,2; -1,3 and 1,4 as well as the hexamethyl diamines; which can be one or several $C_1$–$C_4$-alkyl radicals, such as 2,2,4- or 2,4,4-trimethylhexamethylene diamine-1,6 and others, and 3-aminomethyl-3,5,5-trimethyl-cyclohexyl amine which is also designated as IPD.

Suitable imidiazoline-derivatives in the sense of the present invention which correspond to the earlier-described general formula are, for example, such with possibly aryl-substituted alkyl radicals, like 2-methyl imidazoline; 2,4-dimethyl imidazoline; 2-methyl-4-(n-butyl)-imidazoline; 2-ethyl imidazoline; 2-ethyl-4-methyl-imidazoline; 2-benzyl imidazoline; 2-phenyl imidazoline; 2-phenyl-4-methyl imidazoline, 2-phenyl-4-(N-morpholinylmethyl)-imidazoline; 2-(o-tolyl)-imidazoline; 2-(p-tolyl)-imidazoline and others. Mixtures of the imidazoline derivatives can also be employed according to this invention. This is especially useful, when blocked isocyanates with low melting points or-ranges are required.

The imidazoline derivatives that can be applied according to this invention can be produced from, substituted diamines and aliphatic or aromatic mononitriles in the presence of elemental sulfur or sulfurylchloride as catalysts.

Blocking can, as has been mentioned, also be carried out in solvents. Only such solvents are applicable for this reaction, which do not react with the polyisocyanates; such solvents are ketones, like acetone, methyl-ethyl ketone, methyl-isobutyl ketone, cyclopentanone, cyclohexanone, and others; aromatics like benzene, toluene, xylenes chlorobenzens, nitrobenzene and others; cyclic ethers like tetrahydrofuran, dioxane and others; aliphatic chlorinated hydrocarbons, like chloroform, carbon tetrachloride and others, as well as aprotic solvents like dimethyl-formamide, dimethyl-acetamide, dimethyl-sulfoxide and others.

If the blocking reagent is employed at a ratio of $\geq 1$ to the number of the isocyanate groups, the reaction mixtures are maintained at the indicated temperature until the NCO-content of the reaction mixture has dropped to values below 0.2% NCO, in the case of <1, until a constant NCO-value has been reached.

Also applicable, according to this invention, are such blocked polyisocyanates as are obtained by a subsequent conversion of a group of blocked polyisocyanates, namely those, in which cyclic amidines had been employed at below-stoichiometric amounts, i.e. the ratio between cyclic amidine and isocyanate groups was <1:1 with the same chain lengthening products that had earlier been described as products for lengthening the molecular size. The reaction takes place at temperatures in the range between 20° and 150° C., preferably 80° to 120° C., however, below the de-blocking temperature of the blocked polyisocyanate. With these blocked polyisocyanates, it is possible to produce coatings that cover practical requirements within wide limits. This process variation is of special interest for polyisocyanates with differently reactive NCO-groups.

In this manner, through interchange of the sequence:adduct formation/blocking, blocked polyisocyanates can be obtained with differing reactivity, melting range and structure.

In blocking of diisocyanates and di-valent chain lengthening products, compounds are obtained that can be expressed by the following general formula:

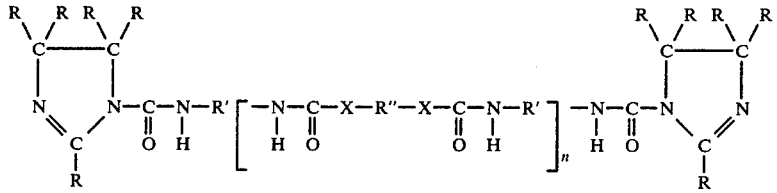

The following meanings can be assigned in this formula: $n=0$ or 1; $X=O$, s or an NH-group; $R=$an equal or different radical selected from the group of hydrogen, alkyl-, cycloalkyl-, aralkyl- and aryl-radical; $R'=$an alkylene-, cycloalkylene- or arylene radical and $R''=$a saturated or unsaturated alkylene radical with 2 to 18 C-atoms, possibly substituted by one or more alkyl radicals, where more than one group can also jointly form a component of a cycloaliphatic ring and, possibly, containing one or more oxygen or sulfur-atoms in the hydrocarbon chain, or it is a cycloalkylene radical.

For the improvement of the flowing properties of the lacquers, so-called flowing additives are added during preparation. These can be represented by chemical compounds or their mixtures of very widely different types, e.g. polymeric or monomeric compounds, acetals, such as
polyvinyl formal, polyvinyl acetal, polyvinyl butyral, polyvinyl acetobutyral or
di-2-ethylhexyl-i-butyraldehyde acetal
di-2-ethylhexyl-n-butyraldehyde acetal
diethyl-2-ethylhexanol acetal
di-n-butyl-2-ethyl-hexanol acetal
di-i-butyl-2-ethyl-hexanol acetal
di-2-ethylhexyl-acetaldehyde acetal and others,
ethers, like the polymeric polyethylene- and polypropylene-glycols; co-polymers from n-butylacrylate and vinyl-isobutylether; ketone-aldehyde-condensation resins; solid silicone resins, or also mixtures of saponified zinc compounds, of fatty acids and aromatic carboxylic acids and similar. Such flowing agents can be contained in the products in amounts of between 0.2 and 5.0 wt-%, relative to the total amount of the powdered lacquer.

Conversion of the hydroxyl-group-containing polyesters with the polyisocyanates that have been released by de-blocking, can be accelerated by catalysts. Examples of suitable catalysts are, on the one hand, organic sulfonic acids, p-toluene-sulfonic acid, on the other hand, they may be organic tin compounds, such as di-n-butyl-tin-dilaurate.

The other components of the heat-hardenable powdered lacquer mixture, such as pigments, colorants, fillers, thixotropic agents, UV- and oxidation-stabilizers and others, can fluctuate within a wide range relative to the amount of the solid polymer.

A further object of this invention is the production of the powdered coating material. In this process, one mixes the solid hydroxyl-group-containing polyester and the blocked polyisocyanates, possibly after addition of the mentioned lacquer additives, in the indicated ratio amounts. The material is subsequently extruded at elevated temperature, in which the polyester and the blocked polyisocyanate are present in molten state; it is then cooled and subsequently, milled to a grain size of less than 0.25 mm, preferably <100μ and a maximum grain size between 20 and 60μ, preferably between 30 and 50μ, and, if necessary, the coarser fraction is then removed by screening.

Application of the powdered lacquer to the bodies to be coated, can take place according to known methods, e.g. electrostatic powder spraying, fluidization dip coating etc.

After application of the powdered lacquer by one of the described methods onto the objects to be lacquered, these are heated for hardening to temperatures above the dissociation temperature of the hardener, i.e. 140° to 200° C., preferably 150° to 180° C. After this, the resulting coating has the described advantages.

All substrates that can tolerate the indicated temperatures without loss of their mechanical properties, such as metal surfaces, glass areas and others, are suitable for coating with the powdered coating materials of this invention.

Having generally described this invention, a further understanding can be obtained by reference to certain specific examples which are provided herein for purposes of illustration only and are not intended to be limiting unless otherwise specified.

EXAMPLE 1

1a. Blocked isocyanate components 106 parts by weight of diethyl glycol were slowly added under appropriate stirring to 144 parts by weight of IPDI at 80° C. After completion of diethylene glycol addition, the material was continued to be heated for 2 hours at 80° C. The NCO-content of the IPDI/diethylene glycol adduct, then amounted to 15%.

1b. At 120° C., 292 parts by weight of 2-phenylimidazoline were added in portions to 556 parts by weight of the adduct, prepared according to 1a from 2 mols IPDI and 1 mol diethylene glycol, in such a manner that the temperature did not rise above 120° C. After completing the 2-phenylimidazoline addition, the reaction mixture was heated for a further hour at 120° C. The reaction product is a pale-yellow powder with a melting range between 100° and 106° C., a glass transition temperature (DTA) of 70° to 90° C. and it has a dissociation temperature of about 140° C.

1c. Polyester:

9 mol (1746 grams) dimethyl-terephthalate, 4 mol (416 grams) 2,2-dimethylpropane-diol-1,3, 3.75 mol (540 grams) 1,4-dimethylol-cyclohexane and 2.5 mol (335 grams) of trimethylol propane were placed together in a 5-liter glass flask and warmed with the help of an oil bath. After the substances had largely melted, 0.05 wt-% of di-n-butyl tin oxide were added at a temperature of 160° as esterification catalyst and the temperature of the bath was raised. The first methanol was split off at a temperature of about 170° C. Transesterification was completed after about 14 hours, whereby transesterification took place in the final phase at a maximum temperature of about 220° C.

After vacuum treatment (at 1 mm Hg) to remove the volatile components and after cooling, the following chemical and physical data were determined:

OH-number: 100–105 mg KOH/gram
Acid number: <1 mg KOH/gram
Melting range (Kofler): 78° to 85° C.
Glass transition temperature (DTA): 38° to 55° C.
Viscosity (at 160° C.): about 15 000 cSt.

1d. Clear lacquer:

55.5 parts by weight of the polyester according to 1c were extruded with 42 parts by weight of the blocked polyisocyanate according to 1b and 0.7 parts by weight of silicone oil from the melt at temperatures between 120° and 130° C. After cooling, the homogeneous mixture was crushed and subsequently milled in a disc attrition mill to a grain size of <100μ. The clear lacquer powder, thus obtained, was applied to degreased steel sheet with an electrical powder-spray apparatus at 60 kV and baked in a circulating air drying cabinet at temperatures between 160° and 180° C. At temperatures >180° C., the hardening temperatures are, naturally, shorter.

The words and abbreviations in the following tables are:

FT=film thickness (in μ)
HK=hardness according to König (in sec.)(DIN 53 157)
HB=hardness according to Buchholz (DIN 53 153)
EP=penetration according to Erichsen (in mm) (DIN 53 156)
GT=grid cut test (DIN 53 151)
Impact rev.=impact reverse (inc. lb)

| Baking Conditions Time/Temperature | Mechanical Data | | | | |
|---|---|---|---|---|---|
| | FT | HK | EP | GT | Impact rev. |
| 25' 160 | 30–45 | >200 | 9 | 0 | >82 |
| 20' 170 | 30–45 | >200 | 8.8 | 0 | >82 |
| 15' 180 | 30–45 | >200 | 8–9 | 0 | >82 |

EXAMPLE 2

2a. Blocked isocyanate components:

To a mixture of 222 parts by weight of isophoronediisocyanate (IPDI) and 300 parts by weight of water-free acetone, 292 parts by weight of 2-phenyl imidazoline that had been dissolved in 500 parts by weight of water-free acetone, were slowly and drop-wise added at room temperature. After completing the 2-phenyl imidazoline addition, the material was heated for 1 hour at 50° C. The acetone was distilled off. The last remainders of the acetone were removed by drying the reaction product at 60° C. in a vacuum drying cabinet. The 2-phenyl imidazoline-blocked IPDI is a white powder with a melting range between 98° and 106° C., a glass transition temperature (DTA) between 63° and 80° C. and it has a dissociation temperature of about 120° C.

2b. Clear lacquer:

The hydroxyl-group containing polyester, described in example 1c was mixed with the crosslinking agent, described in example 2a in equivalent amounts and further processed as in example 1d. Homogenizing, however, took place at temperatures between 90° and 110° C.

Composition:
100 parts by weight polyester accroding to 1c
46.3 parts by weight blocked isocyanate according to 2a
0.74 parts by weight silicone oil OL

| Baking Conditions Time/Temperature | Mechanical Data | | | | | |
|---|---|---|---|---|---|---|
| | FT | HK | HB | EP | GT | Impact rev. |
| 20' 170 | 30–50 | 170 | 111 | 8 | 0 | 70 |

EXAMPLE 3

3a. Blocked isocyanate:

320 parts by weight of 2-phenyl-4-methyl imidazoline were added to 556 parts by weight of the IPDI/diethylene glycol adduct, described in example 1a at 100° C. in such a manner that the temperature of the mixture did not exceed 110° C. In order to complete the reaction, the reaction mixture was heated for a further 2 hours at 110° C. The reaction product is a white powder with a melting range between 95° and 100° C., a glass transition temperature (DTA) of 60° to 85° C. and it has a dissociation temperature of about 150° C. No NCO could be determined in the reaction product.

3b. Clear lacquer:

The polyester, described in 1c was mixed with the crosslinking agent of 3a in equivalent amounts and processed as in 1c.

Composition:
  100 parts by weight polyester as in 1c
  78.3 parts by weight blocked isocyanate as in 3a
  0.74 parts by weight silicone oil OL

| Baking Conditions Time/Temperature | Mechanical Data | | | | | |
|---|---|---|---|---|---|---|
| | FT | HK | HB | EP | GT | Impact rev. |
| 20' 170 | 30–50 | 170 | 111 | 8 | 0 | 70 |

EXAMPLE 4

4a. Blocked isocyanate components:

At 100° C., 196 parts by weight of 2,4-dimethyl imidazoline were dropwise added to 556 parts by weight of the adduct of 2 mols IPDI and 1 mol diethylene glycol, as described in 1a, in such a manner, that the temperature did not rise above 110° C. After completing the 2,4-dimethyl imidazoline addition, the reaction mixture was heated at 110° C. for a further 2 hours. No NCO could be determined in the resulting reaction product. The reaction product is a colorless powder with a melting range between 100° and 107° C., a glass transition temperature (DTA) of 60° to 95° C. and it has a dissociation temperature of about 170° C.

4b. Clear lacquer:

The polyester, described in 1c, was mixed with the crosslinking agent, as described in 4a, in equivalent amounts and further processed as described in example 1c.

Composition:
  100 parts by weight polyester as in 1c
  67.2 parts by weight blocked isocyanate as in 4a
  0.74 parts by weight silicone oil OL

| Baking Conditions Time/Temperature | Mechanical Data | | | | | |
|---|---|---|---|---|---|---|
| | FT | HK | HB | EP | GT | Impact rev. |
| 15' 180 | 40–50 | 190 | 115 | 10.5 | 0 | >82 |

Having now fully described this invention, it will be apparent to one of ordinary skill in the art that many changes and modifications can be made thereto without departing from the spirit or scope of the invention set forth herein.

What is claimed as new and intended to be covered by letters patent is:

1. Powdered, heat-hardenable coating materials with high storage stability and a grain size smaller than 0.25 mm, comprising hydroxyl-group-containing polyesters with melting points between 40° and 120° C., blocked polyisocyanates and, optionally, catalysts wherein the coating material contains polyisocyanates blocked with cyclic amidines of the general formula

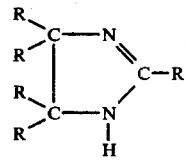

wherein R=equal or different substituents selected from the group consisting of hydrogen, alkyl-, cycloalkyl-, aralkyl- and aryl radicals.

2. Powdered coating materials according to claim 1, wherein the hydroxyl-group containing polyesters and the blocked polyisocyanates are present in such amounts that 0.9 to 1.1 NCO—groups present for each hydroxyl group equivalent.

3. Powdered coating materials according to claim 1, wherein the cyclic amidine-blocked diisocyanate, has the formula

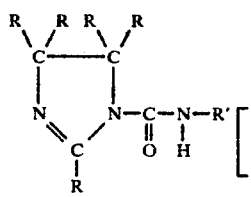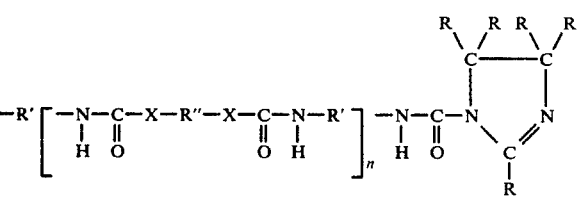

wherein n=0 or 1, X=0, S or an NH-group, R=equal or different radicals selected from the group consisting of hydrogen, alkyl-, cycloalkyl-, aralkyl-, and aryl-radical, R'=an alkylene-, cycloalkylene- or arylene-radical and R" is a saturated or unsaturated alkyl radical having 2-18 C-atoms, which may optionally be substituted by one or more alkyl radicals, wherein more than one of said alkyl radicals may form a cycloaliphatic ring, wherein said alkyl radical having 2-18 C-atoms may optionally carry one or more oxygen or sulfur atoms in its hydrocarbon chain, or wherein said alkyl radical having 2-18 C-atoms is a cycloalkylene radical.

4. A process for the production of the powdered coating materials according to claim 1, which comprises initially mixing solid hydroxyl-group-containing polyesters and blocked polyisocyanates;

extruding said mixture at an elevated temperature at which the polyester and blocked polyisocyanates are in molten condition, wherein said temperature is at least 30° C. below the dissociation temperature of the blocked polyisocyanate, cooling the extrudate and subsequently milling the extrudate to a grain size smaller than 0.25 mm and a minimum grain size between 20 and 60μ, and, optionally removing the coarser fraction by screening.

5. In a process for the coating of a substrate with powdered lacquers comprising finely divided mixtures of hydroxyl-group-containing polyesters with a melting point between 40° and 120° C., blocked polyisocyanates as hardeners and optionally catalysts, which comprises application of the coating on the substrate and hardening at elevated temperatures, the improvement wherein polyisocyanates, blocked with imidazolines of the formula

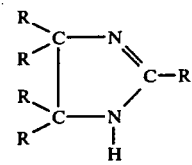

are used as said blocked polyisocyanates, wherein R=equal or different substituents from the group hydrogen, alkyl-, cycloalkyl-, aralkyl-, and arylradicals, whereby the hardener is used in such amounts that 2 to 15 wt.% is applied relative to the amount of solid polymer and hardening is carried out at temperatures between 140° and 200° C.

6. A process according to claim 5, wherein hardening takes place at 150° to 180° C.

7. Powdered coating materials according to claim 1 wherein said blocked polyisocyanate is a blocked diisocyanate.

8. The coatings of claim 1 wherein the grain size of said materials is between 0.02 and 0.06 mm.

9. The process of claim 4 wherein said milling step is carried out to produce a grain size smaller than 100μ.

10. The process of claim 4 wherein said milling step is carried out to produce a grain size larger than 30–50μ.

11. The process of claim 4 wherein the coarser fraction of said powder is removed by screening.

12. The coatings of claim 1 wherein said hydroxy group containing polyester has an OH number between 40 and 240.

13. The process of claim 5 wherein the application of said coating and said substrate is carried out by electrostatic powder spraying.

14. The process of claim 5 wherein the application of said coating and said substrate is carried out by fluidization dip coating.

* * * * *